Sept. 27, 1949. D. R. ZANG 2,483,308
TRACTOR TRACK STABILIZER
Filed Feb. 13, 1946
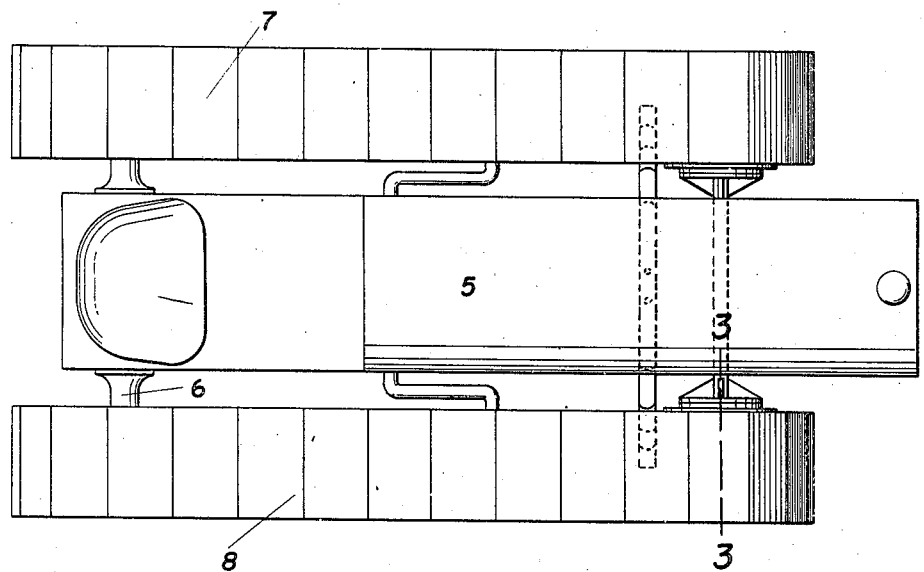
Fig 1
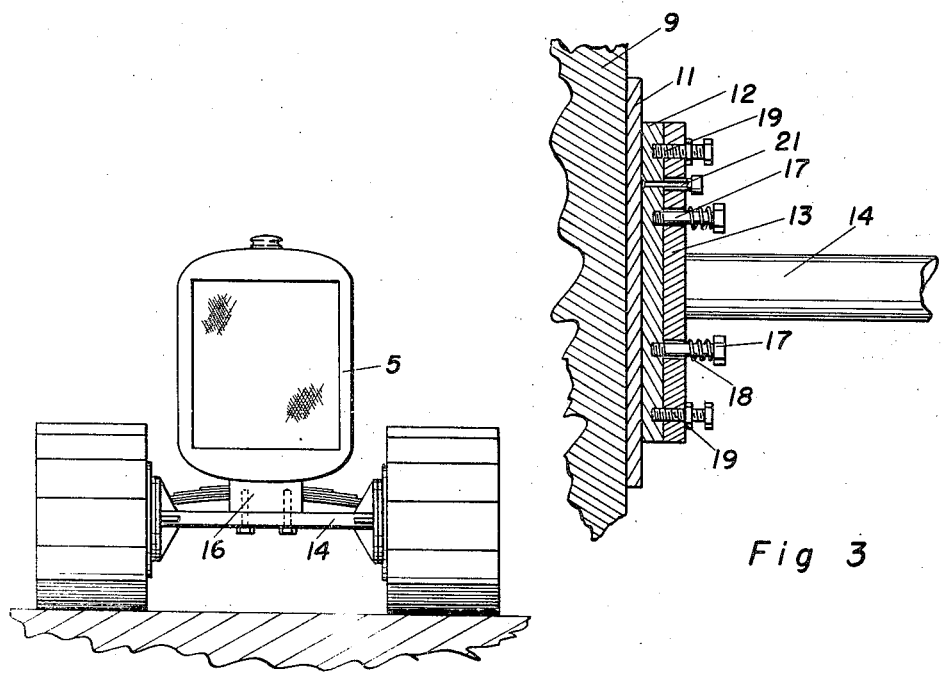
Fig 2
Fig 3
INVENTOR.
David R. Zang
BY
Att'y Patented Sept. 27, 1949

2,483,308

UNITED STATES PATENT OFFICE 2,483,308

TRACTOR TRACK STABILIZER

David R. Zang, Millbrae, Calif.

Application February 13, 1946, Serial No. 647,244

3 Claims. (Cl. 305—9)

This invention relates to improvements in tractor track stabilizers, and has particular reference to a device for regulating the amount of side movement of the ordinary track-laying mechanism of a tractor.

The principal object of this invention is to provide means which may be attached to any ordinary track-laying tractor to prevent the toeing-in of the two track-laying elements, thereby relieving much of the strain on the track-links, the axle and the driving sprockets.

A further object is to produce a device of this character which is economical to manufacture and one which will be easy to install and easily serviced.

A further object is to produce a device which may be adjusted for wear, or the wear-plate quickly replaced with a new one.

Other objects and advantages will be apparent during the course of the following description.

In the accompanying drawings forming a part of this specification and in which like numerals are employed to designate like parts throughout the same, Fig. 1 is a top plan view of an ordinary track-laying tractor having my invention applied thereto.

Fig. 2 is a front end elevation of Fig. 1, and

Fig. 3 is an enlarged fragmentary detail cross-sectional view, taken on the line 3—3 of Fig. 1.

The ordinary track-laying tractor consists of a vehicle body, to which is pivoted, through the medium of the rear axle, two track-laying elements, one on each side of the body, and both capable of being independently driven so as to propel the tractor over the ground.

Inasmuch as these tracks are pivoted so as to rock about the axis of the rear axle, they will have up and down movement toward their forward ends as they travel over rough ground; also, as these front ends are practically unsupported, other than by a loosely mounted body-supporting leaf spring, there is a tendency to cause the front ends of the track to toe in and to otherwise get out of alignment, thus causing excessive strain upon the tractor parts, particularly upon the driving mechanism such as the rear axle as well as the links of the track and the supporting sprockets.

Applicant, therefore, has devised means whereby the front end of the track units are kept spaced apart a uniform distance, thus preventing the toeing-in of the same, but permitting up and down movement of the tracks independently of each other.

In the accompanying drawings wherein for the purpose of illustration is shown a preferred embodiment of my invention, the tractor body as a whole is designated by the numeral 5 and is provided with a rear axle 6, to which the track units 7 and 8 are attached and driven in the customary manner.

Each track unit consists of a frame in which are mounted the usual sprockets, over which the links forming the tread or track are reaved, and are driven by the rear sprocket, which is connected to the rear axle 6.

My invention consists of attaching to the frame of each track unit 9 a plate 11, which plate may be welded or otherwise attached thereto. This plate 11 is in turn contacted by a wear-plate 12 adjustably supported on a carrier-plate 13 mounted upon a spreader-bar 14, which is in turn suspended from the front of the body 5 as by a block 16. (See Fig. 2.)

The wear-plate 12 is supported on the carrier-plate 13 by a series of bolts 17 secured thereto and sliding through openings in the carrier-plate 13.

Springs 18, positioned on the bolts 17 and engaging the plate 13 and the head of the bolts 17, tend to hold the wear-plate 12 toward the carrier-plate 13.

Adjusting bolts 19 serve to overcome the tension of the springs 18 and to force the wear-plate 12 toward the plate 11, so that adjustment may be made as the plates 11 and 12 wear.

An oil or grease fitting is shown at 21 which permits the lubrication of the contacting surfaces of the plates 11 and 12.

It will be apparent that as the tractor moves over uneven surfaces, and as the track units 7 and 8 move up and down, due to the undulations of the earth, that the wear-plates 11 will move up and down against the plates 12, and inasmuch as these wear-plates are spaced a definite distance apart by the spreader-bar 14, it becomes obvious that the two track units cannot move toward each other so as to toe in. These plates tend also to keep the frames 9 from twisting due to torsion strains.

It will, therefore, be apparent that I have eliminated one of the principal defects in the ordinary track-laying tractor.

It is to be understood that the form of my invention herewith shown and described is to be taken as a preferred example of the same and that various changes relative to the material, size, shape and arrangement of parts may be resorted to without departing from the spirit of the invention or the scope of the subjoined claims.

Having thus described my invention, I claim:

1. In a device of the character described, the combination with a tractor, having a pair of track-laying elements, each comprising a frame and a tread portion, a plate secured to each of the frames, a wear-plate slidably engaging each of said first mentioned plates, and a spreader-bar extending between said wear-plates and supporting said wear-plates, said spreader-bar being secured to the body of the tractor.

2. In a device of the character described, the combination with a tractor having a body portion and a pair of track-laying elements pivotally connected thereto, each of said track-laying elements consisting of a frame and a track movable thereon, a plate secured to the opposing faces of said frames, a spreader-bar connected to said body, a carrier-plate mounted on each end of said spreader-bar, and a wear-plate attached to each of said carrier-plates and engaging the plates on said frames.

3. In a device of the character described, the combination with a tractor having a body portion and a pair of track-laying elements pivotally connected thereto, each of said track-laying elements consisting of a frame and a track movable thereon, a plate secured to the opposing faces of said frames, a spreader-bar connected to said body, a carrier-plate mounted on each end of said spreader-bar, a wear-plate attached to each of said carrier-plates and engaging the plates on said frames, and means for adjusting said wear-plates with respect to said carrier-plates whereby said wear-plates will be held in engagement with said first mentioned plates.

DAVID R. ZANG.

REFERENCES CITED

The following references are of record in the file of this patent:

UNITED STATES PATENTS

| Number | Name | Date |
|---|---|---|
| 2,082,920 | Tye | June 8, 1937 |